United States Patent [19]

Walters

[11] 4,352,371

[45] Oct. 5, 1982

[54] LOW-HIGH FLOW RATE VALVE

[76] Inventor: William R. Walters, 910 W. Caddo, Cleveland, Okla. 74020

[21] Appl. No.: 138,583

[22] Filed: Apr. 8, 1980

Related U.S. Application Data

[63] Continuation-in-part of Ser. No. 128,446, Mar. 10, 1980, Pat. No. 4,298,022.

[51] Int. Cl.³ .............................................. F16K 31/18
[52] U.S. Cl. .................................... 137/414; 137/451; 251/28; 251/46; 251/122
[58] Field of Search ............... 137/413, 414, 451, 434, 137/448, 415, 489, 491, 625.3, 625.33; 251/45, 46, 118, 120, 121, 122, 5, 45, 61.1, 205, 28

[56] References Cited

U.S. PATENT DOCUMENTS

| | | | |
|---|---|---|---|
| 1,336,769 | 4/1920 | Welshausen | 137/434 |
| 2,283,973 | 5/1942 | Criss | 251/46 |
| 2,573,369 | 10/1951 | Snoddy | 251/46 |
| 2,632,464 | 3/1953 | Kerr | 251/28 |
| 2,833,300 | 5/1958 | Sirotek | 251/46 |
| 2,895,707 | 7/1959 | Bailey | 137/414 |
| 3,135,287 | 6/1964 | Kepka et al. | 137/414 |
| 3,242,940 | 3/1966 | Sirotek | 137/414 |
| 3,255,775 | 6/1966 | Albro et al. | 251/118 |
| 3,574,310 | 4/1971 | Souriau | 251/61.1 |
| 3,690,344 | 9/1972 | Brumm | 251/5 |
| 4,072,164 | 2/1978 | Kaden | 137/414 |
| 4,198,029 | 4/1980 | Johnson | 251/61.1 |

FOREIGN PATENT DOCUMENTS 12336 of 1904 United Kingdom ................ 137/414

Primary Examiner—George L. Walton
Attorney, Agent, or Firm—Head, Johnson & Stevenson

[57] ABSTRACT

A float operated valve for controlling the rate of flow of water from a pipe carrying water under pressure, to a vessel, comprises a pipe having an end opening of selected diameter and a flange of larger diameter surrounding the pipe. A flexible diaphragm is attached over the flange having a central closure pad adapted to cut off water flow when pressed against the pipe. A small orifice is drilled through the diaphragm so that when the flow is shut off, water can still flow through the orifice to the second side of the diaphragm. A second short pipe having a similar flange is bolted against the diaphragm to the first flange, to provide a water tight seal. There is a second small orifice in the second end of the second pipe, and a float mechanism is provided with a closure tip to close the second orifice when the water level is at a selected value. The closure tip provided can vary the size of the second orifice so that as soon as it is opened, the orifice size is a minimum. As the water level drops, the tip moves farther away and the orifice is enlarged. Depending on the ratio of areas of the first and second orifices, water pressure on the second side of the diaphragm prevents flow. When the second orifice reaches a selected area the diaphragm is no longer pressed against the first pipe, and a high flow of water is provided.

10 Claims, 8 Drawing Figures

LOW-HIGH FLOW RATE VALVE

CROSS-REFERENCE TO RELATED APPLICATION

This application is a continuation in part of my co-pending application Ser. No. 128,446 filed Mar. 10, 1980, now U.S. Pat. No. 4,298,022, entitled Energy Saver Control for Outdoor Water Heater. Application Ser. No. 128,446, now U.S. Pat. No. 4,298,022, is entered into this application by reference.

BACKGROUND OF THE INVENTION

1. Field of the Invention

This invention lies in the field of water control valves. More particularly it concerns a float operated valve which permits water to trickle at a low flow rate into a tank when the water level is only slightly dropped below a selected level. However when the level is dropped more than a selected amount the valve opens farther to permit a high flow rate of water.

2. Description of the Prior Art

In the prior art as represented by my co-pending application Ser. No. 128,466, now U.S. Pat. No. 4,298,022, entitled, Energy Saver Control for Outdoor Water Heater and filed Mar. 10, 1980, now U.S. Pat. No. 4,298,022, a float valve is utilized for opening or intitiating a flow of water into an outdoor tank. Means are provided for restricting the flow into the tank, so that in cold weather, particularly, a small trickle of flow is provided to maintain a turbulent surface of the water in the tank so as to minimize freezing. Thus as the water level is lowered in the tank, water flow is limited by appropriate means such as a needle valve, or an orifice, so as to flow at a minimum rate consistent with maintaining a clear water surface. However if it should be desired to fill the tank rapidly, then a manual operation is required, to open the needle valve or remove the orifice, in order to get a much higher flow rate.

In FIG. 3 of my co-pending application Ser. No. 128,466, now U.S. Pat. No. 4,298,022, a situation is shown in which there are two float-operated valves one which controls a low rate of flow when the water level is high and the other which controls a high rate of flow when the water level is much lower.

This invention is designed to provide both of these features, that is a low-rate of flow or a high-rate of flow, depending on the specific level of liquid in the tank, and this is done with one float-operated valve, whereas in my prior application, two floats and two float operated valves were required.

SUMMARY OF THE INVENTION

It is a primary object of this invention to provide a float-operated valve, which operates in either of two modes, a first mode is involved when the level of the water in a tank which is monitored by the float drops a selected small amount from the normal level, in which case a low rate of flow of water from the valve is provided. In the second mode, when the water level drops by a large amount below the selected level, the water flow then continues at a high rate of flow to bring the level back to the vicinity of the normal level at which time the first mode of operation takes over.

These and other objects are realized and the limitations of the prior art are overcome in this invention by providing a valve controlled by a float, to monitor the level of water in a vessel or tank. A pipe, through which water flows from a pressurized source into the tank has a flange surrounding the end of the pipe. A flexible diaphragm covers the flange, and the end of the water pipe, such that when the pressure of water on the second side of the diaphragm reaches a critical value, it presses against the opening in the pipe to shut off the flow of water. A second short pipe attached to a similar flange is clamped over the second side of the diaphragm, to the first flange, to provide a water tight seal around the periphery of the diaphragm.

A first orifice of small size is drilled through the diaphragm to permit a trickle of selected low flow rate of water through the first orifice even though the main flow of water is closed off by the diaphragm. The second pipe is terminated with a second small orifice of variable area. A float-operated arm carrying a closure tip is provided to press against the second small orifice when the level of the water reaches a selected value.

This arrangement provides a closed small volume or chamber on the second side of the diaphragm, which has an entry opening of small size at the first orifice, and a second exit opening of small size, at the second orifice. When the second orifice is closed the pressure P2 in that chamber reaches the value of pressure P1 inside the pipe. Because of the larger area of the diaphragm compared to the area of the first pipe, there is a force pressing the closure portion of the diaphragm against the end of the first pipe shutting off the flow.

The two orifices in series comprise a pressure drop mechanism in which the pressure P2 in the chamber can vary between a value P1 equal to that in the first pipe, to a value of atmospheric pressure 3 or P0, when the second orifice is wide open. Of course, when the pressure P2 on the second side is zero, the diaphragm is forced aside by the pressure P1 in the first pipe, and a large flow is permitted into the tank. When the area of opening of the second orifice is smaller than that of the first orifice the pressure in the second chamber is some value P2 which is intermediately between the value maximum of P2 and atmospheric pressure, P0.

Depending upon the ratio of areas of the diaphragm A1 and the area A2 of the opening in the first pipe, it is clear that when the force pressing the diaphragm against the first pipe is equal to the pressure P1 in the first pipe, times the area A2 of the first pipe, flow will be cut off. Therefore, the unit pressure acting against the larger area A1 of the diaphragm can shut off the flow even though the pressure P2 is much less than P1. In fact, P2 can be quite low, which would result when the ratio of area of opening A4 of the second orifice, to the area A3 of opening of the first orifice is a selected value. Thus, when the second orifice is first opened, and is smaller than the first orifice the flow from the first pipe will be small corresponding to that through the first and second orifices. When the second orifice is opened to its widest value and the pressure in the chamber is below the critical pressure PC, then the flow goes to a high rate, depending upon the area A2 of the outlet of the first pipe.

It is clear, therefor, that by changing the area of the second orifice in response to minute changes in the water level in the tank, a low rate of flow of liquid into the tank is permitted. But when the water level has dropped to a considerably lower value, and the second orifice opens to its largest area, then the diaphragm moves away and permits the high rate of flow of water to the tank.

BRIEF DESCRIPTION OF THE DRAWINGS

These and other objects and advantages of this invention and a better understanding of the principles and details of the invention will be evident from the following description taken in conjunction with the appended drawings, in which:

FIG. 5 illustrates a combination of two float valves, one controlling the rate of water flow into the tank at a small rate of flow, and the other controlling the water flow into the tank at a high rate of flow.

DETAILED DESCRIPTION OF THE PREFERRED EMBODIMENTS

In my co-pending application which was entitled "Energy Saver Control for Outdoor Water Heater" a type of flow control was provided such that the rate of flow of water from a supply line into an outdoor tank of water would be controlled by a float so that it would flow into the tank at a low rate of flow, sufficiently high so that it would provide a turbulence to the surface of the water and prevent the formation of ice, thereby providing a free surface of water for the cattle to drink. This involved the use of a needle valve or a small orifice to control this rate of flow when the float valve was open.

Figure 3:
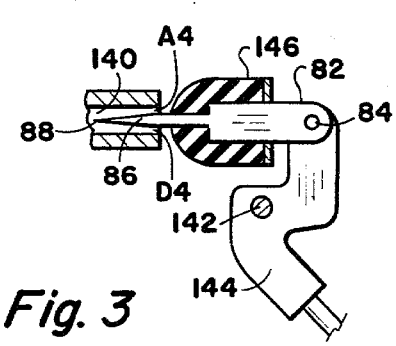
FIG. 3 illustrates an alternative design of the elastmeric closure tip.
Figure 4:
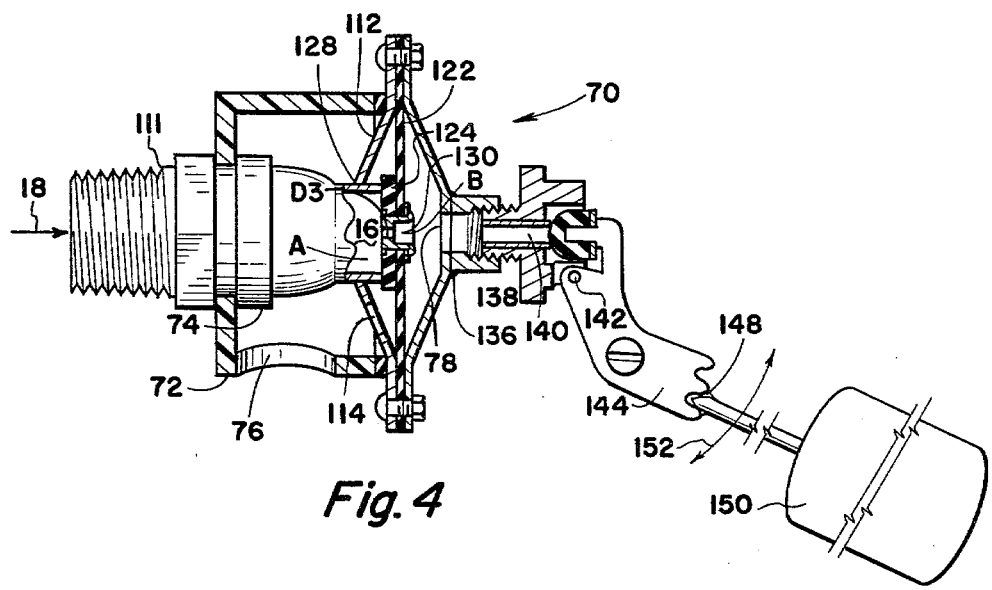
FIG. 4 illustrates in cross-section the construction of the finished apparatus.

However, under some conditions, it is desirable to have a high rate of flow such as when the level of the water in the tank is quite low. This condition would require manual attention, such as by opening the needle valve, and then later reclosing it to the small area that would provide the desired trickle of water. In FIG. 3 of that co-pending application and now shown as FIG. 5 in this application, there are shown two float valve systems one 18A' which is conventional and provides a large opening for water flow, once the water level drops below the level 14A', where the flow is no longer shut off. A second float valve system that controls the level to a higher valve, 14', than the first one, but controls it with a low rate of flow of water. Thus, when a minor change in level occurs, the second float system operates and provides a desired trickle of water, and when a large level of water change occurs, both float valves open so that the large flow from the first one quickly raises the level of water in the tank and shuts itself off, and the second one then continues to control the level, at a low flow rate.

Figure 5:
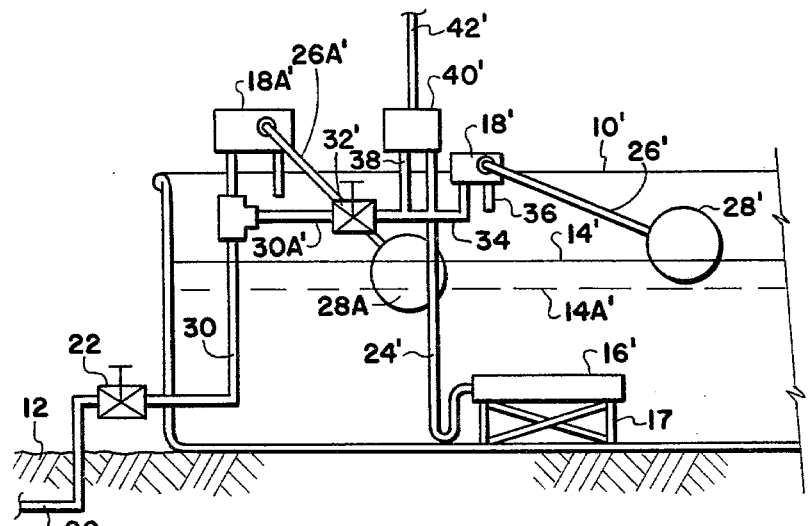
FIG. 5 is an illustration taken from my co-pending application Ser. No. 128,466, now U.S. Pat. No. 4,298,022, in which application this Figure was number 3.

While the principle object of my co-pending application Ser. No. 128,466, now U.S. Pat. No. 4,298,022, was to provide a method of controlling the expenditure of electrical energy to heat that water tank, the fact remains that the attached FIG. 5 illustrates a type of float valve system, which provides a low rate of flow, or a high rate of flow dependent upon the amount by which the normal water level in the tank is reduced. When the water level is slightly lowered the flow rate is low, and when the water level is greatly lowered, a high rate of flow takes place.

Figure 1:
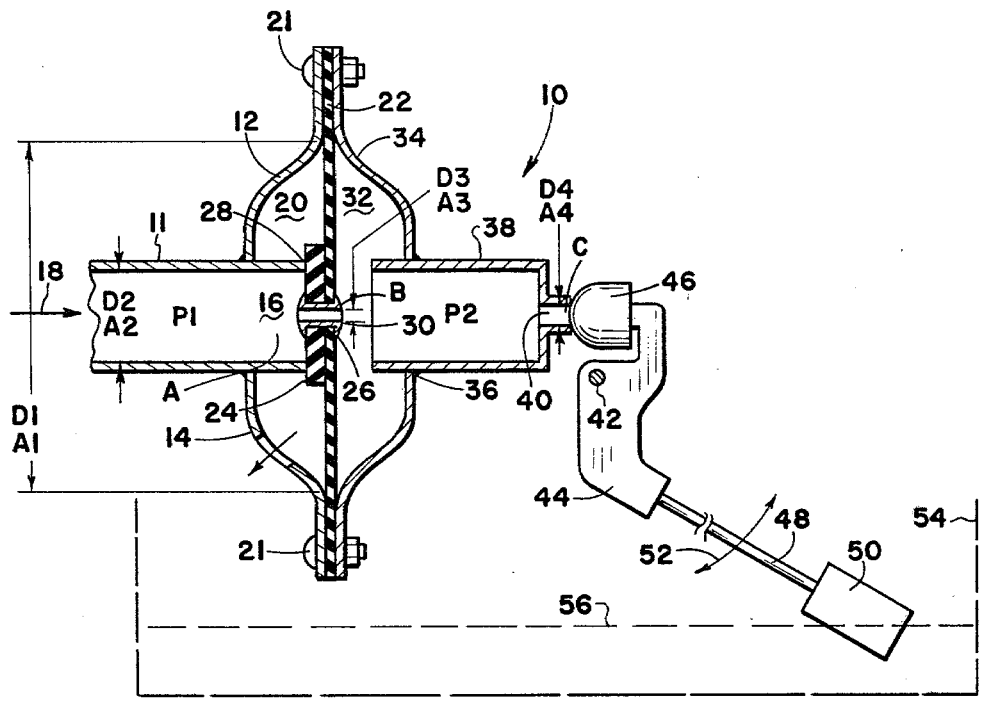
FIG. 1 is a schematic diagram illustrating the operation of the flow valve of this invention.
Figure 2:
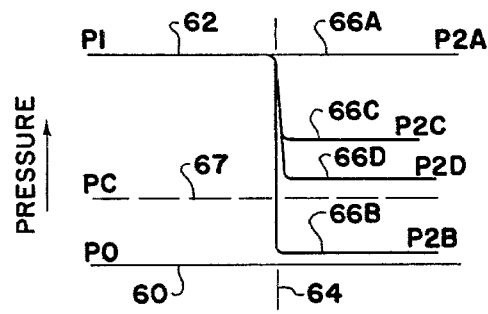
FIG. 2 illustrates schematically the pressure relations in the space 16 within the supply pipe, and in the space on the second side 32 of the diaphragm.

In this invention the type of operation illustrated by FIG. 5 is carried out in a much simplified apparatus with only a single float. Referring now to FIGS. 1, 2 and 3 there is shown one embodiment of my invention which schematically illustrates the method of operation.

A supply of pressurized water not shown, provides a flow of water in accordance with arrow 18 into and through a pipe 11 which has a terminal opening 28 of diameter D2, or area A2. This pressure in the space 16 in the first pipe 11 is P1.

A circular flange 12 of considerably larger diameter D1, and corresponding area A1, surrounds the end 28 of pipe 11. A flexible diaphragm 22 of the same diameter as the flange 12 is sealed against the flange 12. The flexible diaphragm carries a closure plate 24 on the side facing the pipe 11, so that when a sufficient force is applied to the second side of the diaphragm in space 32, to press the closure plate 24 against the end 28 of the pipe 11, the flow can be shut off. A small orifice 30 is provided in the closure plate 24, and diaphragm 22 so that flow can go from space 16 in the pipe 11 through the first orifice 30 to the second side 32 of the diaphragm. The diameter of the first orifice is D3 and the area is correspondingly A3. This first small orifice can be conveniently drilled in a rivet 26 which holds the closure plate 24 to the diaphragm 22.

A second short pipe 38 is attached to a second flange 34 of equal size to the first flange 12, which is clamped against the second side of the flexible diaphragm to the first flange by means such as screws 21, or equivalent means, so as to seal the diaphragm between the two flanges. The space between the first flange 12 and the diaphragm is indicated by numeral 20, and this space is vented to the atmosphere by at least one opening 14. Thus, when flow is not shut off from pipe 11 by the closure plate 28, the flow from the pipe 11 will exit through the opening 14 into the tank. The tank is shown in dashed outline by numeral 54 having a water level 56. The space or volume of the chamber on the opposite side of the diaphragm 22 from the pipe 11 is indicated by numeral 32, and there is a pressure in the water in the space 32 indicated as P2.

A second small orifice 40 is provided on the end of the short pipe 38, which has a diameter D4 and an area A4. This is closed by means of a closure tip 46, which can be of elastomeric material, as is well known in the art, and is mounted on a hinged arm 44, which rotates about a pin or axis 42. The arm 44 has a long rod 48 carrying a float member 50 which is adjusted to rest on the water level 56, and when the water level is at the proper value the float will be raised in accordance with arrow 52 and the tip 46 will be pressed against the second orifice 40 to close it off.

When the second orifice 40 is closed off, water still continues to flow through the first orifice 30 into the space 32 and will continue to flow until the pressure P2 in space 32 is equal to some value such that P2 times the area A1 of the diaphragm is equal to P1 times the area A2 of the end 28 of the pipe 11. Because the area A1 is many times larger than the area A2, it is clear that a pressure in the space 32 much lower than P1 will be sufficient to provide a closure force against the end 28, equal to that due to the pressure P1 in the first pipe 11 over the area A2.

This is illustrated in FIG. 2 where there is shown a graph having a zero pressure P0 which will be atmospheric pressure numeral 60, ordinate represents pressure. There will be a line 62 representing the pressure P1 in the pipe 11. Assume that the ratio of area A1 to area A2 is some figure, which, for example, could be 10. Then, when there is a pressure P2 greater than P1 divided by 10, such as P2D, represented by line 66D, the force holding the diaphragm against the end of the pipe 11 is still higher than the force tending to open pipe 11. There is a selected critical value of pressure, PC, where there is a balance of forces on the diaphragm. If the pressure P2 is greater than PC, high flow rate is cut off. If P2 is less than PC, high flow continues.

Thus, the pressure in space 32 can be reduced, such as when the level 56 drops a small amount, the float will drop, and the area of the second orifice 40 opens a small amount, and is, for example, equal to that of the first orifice 30. This is represented by the line 66C corresponding to a pressure P2C.

When the float level drops down farther, the the second orifice 40 is fully open, if the area A4 of the second orifice is now larger than the first orifice area A3, the pressure in space 32 will drop to a value P2B, represented by line 66B, which is below the critical pressure PC shown by the dashed line 67. In that case, there is not sufficient force holding the diaphragm against the opening 28 of the pipe 11, and the pressure P1 then forces a large rate of flow out of the opening 28, and out of the opening 14, into the tank 54. This will quickly bring the level of water 56 up to a point where the second orifice 40 closes and the pressure then builds up in space 32 to a value higher than PC, and the diaphragm then closes off flow through the pipe 11.

In FIG. 3 is shown an alternative preferred embodiment, of a type of closure for the opening 40, which is closed by the closure tip 146. The closure tip 146 can be of elastomeric material such as rubber or other compliant sealing material, and is supported by a short arm 82, which has an extension in the form of a needle 86 which tapers from a large diameter down to a very small diameter 88. The arm 82 is hinged at pin 84, to the control arm 144, which rotates about the shaft 142, and carries the rod 48 and float 50, as shown in FIG. 1.

When the tip 146 is placed tightly against the end of the opening 140 the opening will be closed. As the tip 146 moves away, the opening 140 will be in the form of an annular space between the needle 86, and the opening 140. If this area A4 is small, of the order of that of the first orifice A3 then as previously mentioned there will be a drop of pressure in the space 32 but it will be at some level higher than PC of FIG. 2 and the diaphragm will remain closed against the pipe 11. As the level 56 in the tank drops slightly more then arm 82 moves out farther, and because of the taper of the needle 86 the annular area becomes larger and the pressure P2 drops more, until the annular area A4 becomes large compared to the area A3 of the first orifice. The pressure P2 then equals, or is less than the critical pressure PC, and the diaphragm moves away from the pipe 11, premitting a high flow rate of water.

It is clear therefore that with a type of flow control illustrated in FIG. 3 with the apparatus of FIG. 1 the flow from the pipe 11 can be at a slow trickle rate through the first and second orifice when the water level 56 drops only slightly, but will be at a high rate of flow when the water level drops to a value considerably lower than the level 56.

Referring now to FIG. 5 which is taken from my co-pending application Ser. No. 128,466, now U.S. Pat. No. 4,298,022, which has been entered into this application by reference, there is shown a tank 10' resting upon the earth 12 and having a water level at the indicated level of 14'. The water line 20 is provided with a shut off valve 22 of conventional type, and a riser pipe 30 supporting a conventional float type water level control system 18A'. This receives line pressure water through the pipe 30 and is controlled by the arm 26A' carrying the float 28A, which assumes a level corresponding to a depressed level 14A' below the desired level 14' prime. It is clear that with the level at 14A' and with a conventional float control valve, water would flow into the tank from the control 18A' to bring the level quickly up to the level 14'.

The pressure line 30 has a T and a second line 30A' which has a flow rate control valve 32' such as a needle valve, or an orifice, as described in Ser. No. 128,466, now U.S. Pat. No. 4,298,022. This supports a second float control valve 18' with an arm 26' and float 28' which is adjusted to be sensitive to the desired level of water surface 14'. Water flows into this control valve 18' through line 34 at the low rate set by the control 32'. When the level 14' drops and float 28' drops, 18' then opens and allows the flow through pipe 36 at the low rate of flow through the control 32'.

It is clear therefore that with two sets of float controlled valves 18' and 18A' that one can provide flow at a small rate of flow corresponding to the control 32' while the other is sensitive to a lower level of water in the tank and provides flow at a high rate, which is not restricted corresponding to that through the pipe 30. Thus, the system of FIG. 5 represents one embodiment of a high-low flow rate float control valve system.

It is clear however that as shown in FIG. 1 the apparatus there described will do the equivalent of the two float control systems 18' and 18A' of FIG. 5, and the much simplified apparatus of FIGS. 1 and 3 will provide an equal result.

While I have described this invention of FIG. 1 in terms of a water level control system for use in outdoor tanks as covered in my co-pending application Ser. No. 128,466, now U.S. Pat. No. 4,298,022, this high-low flow rate water level control system, can be used in any type of application where a fine control of water level is required for small variations in level, but a high rate of flow is required for a large drop in level. Thus this invention should not be limited to the application illustrated in FIG. 5 which is only one of many possible applications.

Also, while I have shown the closure means in FIG. 3 as a combination of an elastomeric pad 146 plus a needle valve 86, it could be a needle valve alone. Also the single second small orifice and a third small orifice can be connected in parallel, which would be sequentially closed by the closure tip 46.

Figure 6:
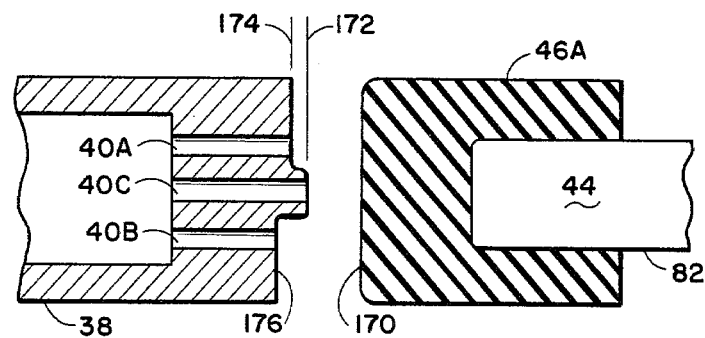
FIGS. 6 and 7 illustrate the use of a plurality of second small orifices in parallel.

Referring now to FIG. 6 there is shown another embodiment of the second small orifice C of FIG. 1. However, instead of a single small orifice there are shown three smaller parallel orifices 40, 40A, and 40B, which are of a total cross-sectional area about equal to that of 40 of FIG. 1. Also, the three orifices are of slightly different lengths as shown. Also, the closure member 46B, unlike 46, is flat across the closure surface instead of being hemispherical. Thus, when the float rises the face 170 of 46A is moved to the left and first closes 40C, then 40A and then 40B as it continues to move to the left. Thus the second small orifice 40 has an area which varies with the level of the float, and thus with the position of the closure 46A. Of course, the closure 46A must be compressible enough that it can simultaneously close all three openings. Such materials are well known in the art.

Figure 7:
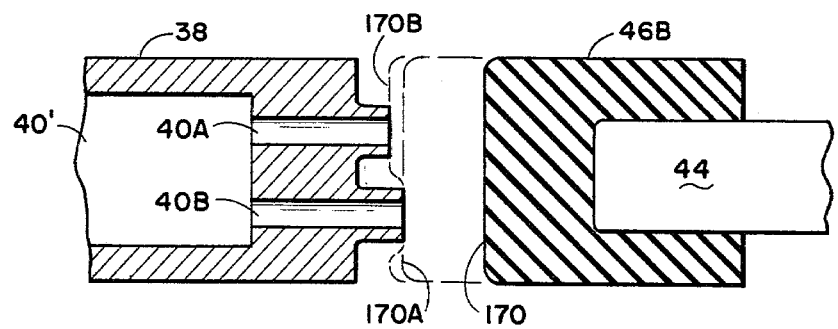

FIG. 7 is similar except that the orifices 40A and 40B comprise small tubes which project beyond the end of 38. The figure shows successive positions 170A, 170B of the closure surface 170 of 46B as the level of water rises.

Figure 8:
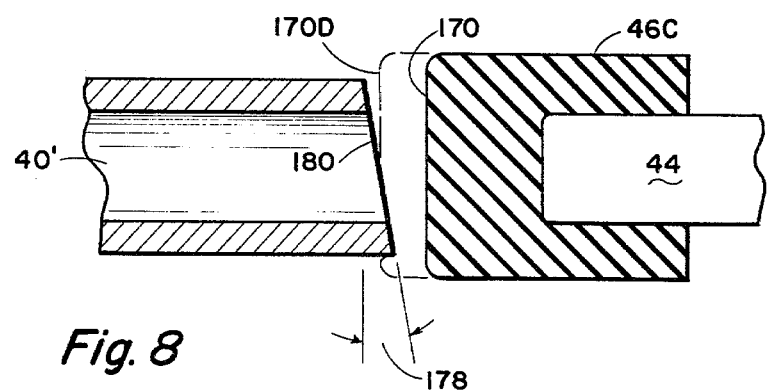
FIG. 8 illustrates another embodiment of a second small orifice.

FIG. 8 illustrates another embodiment of the second small orifice C of FIG. 1. Here again a flat closure face of the closure 46C is used. There is only a single small orifice 40; but the end face 180 is cut at a selected angle 178 to the plane perpendicular to the axis of 40'. The drawing shows 170D at an intermediate position of the contacting face 170, where it has reduced the cross-sectional area of the opening 40'.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A float-operated valve for controlling the flow of liquid from a conduit carrying said liquid under pressure, P1, to a vessel, comprising:
   (a) a conduit carrying said liquid, terminating in a first flange of selected diameter D1, having a first control opening of D2, where D1 is large compared to D2; a second opening in said first flange;
   (b) a flexible diaphragm of diameter D1 adapted to be clamped over said flange and to cover said first opening; said diaphragm flexible enough to have its first surface pressed against said first opening to close off flow through said first opening;
   (c) a first small orifice of selected diameter D3 through the center of said diaphragm and having an area A3, from its first surface to its second surface, where D3 is small compared to D2;
   (d) a second flange adapted to be clamped over said second surface of said diaphragm to said first flange, enclosing said diaphragm in a liquid tight seal; said second flange having an opening, and attached over said opening is a first end of a short second pipe;
   (e) a second small orifice of area A4 closing off the second end of said short second pipe, and rigidly attached to said conduit, where A4 is larger than A3 the inside of said second flange is opened to the atmosphere through said second small orifice;
   (f) float-operated closure means to vary the area of said second small orifice as a function of liquid level in said vessel; and in which
   (g) the effective area of said second small orifice comprises at least two positions; at least one of said positions extends outwardly from said valve farther than the at least other of said positions;
   said elastomeric closure tip moves toward said second small orifice, responsive to the rising of said float, to first contact a first portion of said small orifice to define at least one of said positions and because of the compliance of said closure tip, it is indented into a contact face of said closure tip and is closed; and with further movement of said closure tip the contact face closes a second portion of said second small orifice to define said at least other position;
   and as said portions of said second small orifice are successively closed, the area of said second small orifice is progressively reduced, to zero.

2. The apparatus as in claim 1 in which the area of said diaphragm of diameter D1 is A1, and the area of said first opening of diameter D2 is A2.

3. The apparatus as in claim 2 in which the ratio A1/A2 is at least 5.

4. The apparatus as in claim 2 in which the ratio A1/A2 is at least 10.

5. The apparatus as in claim 1 in which said second small orifice comprises at least two smaller orifices in parallel, which would be sequentially closed by said closure means.

6. The apparatus as in claim 1 in which said portions of said second small orifice comprise at least two small diameter pipes, one of which extends outwardly from said valve, farther than the other.

7. The apparatus as in claim 1 in which said second small orifice is in a transverse end wall, the outer surface of which comprises at least two parts one of which extends outwardly farther than the other, with at least two smaller orifices drilled through said wall, one in each part.

8. The apparatus as in claim 1 in which said second small orifice is a tube of selected small diameter with its outer end cut in a plane at a selected small angle to a plane perpendicular to the axis of said tube.

9. A float-operated valve for controlling the flow of a liquid from a conduit carrying said liquid under pressure, P1, to a vessel, comprising:
   (a) a conduit carrying said liquid, terminating in a first flange of selected diameter D1, having a first control opening or diameter D2, where D1 is large compared to D2; a second opening in said first flange;
   (b) a flexible diaphragm of diameter D1 adapted to be clamped over said flange and to cover said first opening; said diaphragm flexible enough to be pressed against said first opening to close off flow through said first opening;
   (c) a first small orifice of selected diameter D3 through the center of said diaphragm and having an area A3, where D3 is small compared to D2;
   (d) a second flange adapted to be clamped over said diaphragm to said first flange, enclosing said diaphragm in a liquid tight seal; said second flange having an opening, and attached over said opening is a first end of a short second pipe;
   (e) a second small orifice of area A4 closing off the second end of said short second pipe, where A4 is larger than A3, and
   (f) float-operated closure means to vary the area of said second small orifice as a function of liquid level in said vessel; and in which
   (g) said second small orifice comprises at least two smaller orifices in parallel a first of which terminates outwardly farther than at least a second of which, at least two smaller orifices would be sequentially closed by said closure means as it moves toward said smaller orifices responsive to the rising float;

and depending upon the instantaneous effective area of the sum of said two smaller orifices, the flow-rate of liquid into said vessel would be high, low or zero.

10. The apparatus as in claim 9 in which the areas of said first and second smaller orifices are A4' and A4" respectively, and the sum of A4' and A4" is equal to A4 and is greater than A3; and the separate areas A4' and A4" are both less than A3;

whereby when A4' and A4" are both open, the main valve A2 will open; when one or the other of A4' and A4" is closed, the main valve will close, but a small flow limited by either A4' or A4", whichever is open, will continue until the liquid level is high enough to close both A4' and A4", when the flow will be stopped.

* * * * *